9375X
W. Gerrish,
Boot Crimp,
Patented Feb. 10, 1836.
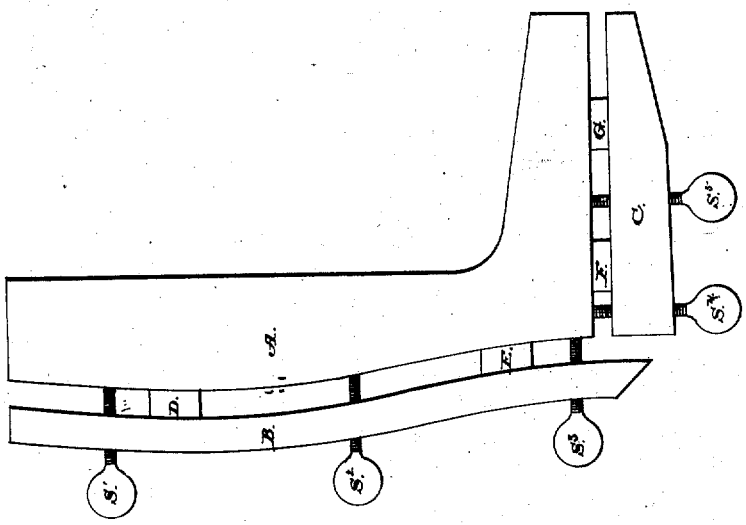
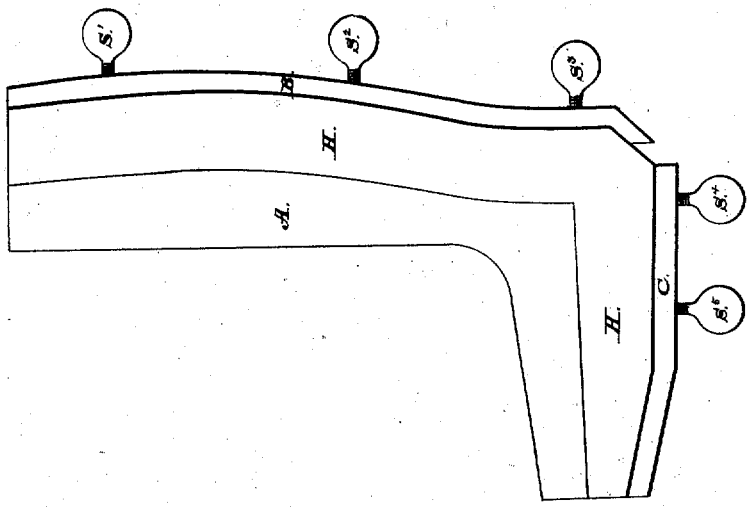
N. PETERS, PHOTO-LITHOGRAPHER, WASHINGTON, D. C.

Feb. 10. 1836 9375X 197

William Gerrish. of Poland. State of Maine

Letters Patent.

The schedule referred to in these Letters Patent and making part of the same, containing a description in the words of the said William Gerrish himself of his improvement in the crimping form for crimping Boot fronts To all to whom these presents shall come Be it known, that I William Gerrish of Poland in the County of Cumberland, and State of Maine Shoemaker, have invented a new and useful improvement in manufacturing boots, being a machine to crimp or form the boot-fronts called a crimping form. and the following is a full and exact description of the construction and operation of said machine as invented or improved by me A. in the annexed drawing No. 1 represents the front of the crimping form over which the boot front is placed and fastened by tacks to B. & C. the back and front pieces of the crimping form B. represents the back piece and C the foot piece of the crimping form to each of which the boot front is fastened by tacks D. E. F. G. represent four slides entering and made fast in the front piece A. and passing through the back piece B. and the foot piece C. of the crimping form, on which the back piece B. and foot piece C. move and by which their movement is regulated, and the form is kept in shape as the back piece B. and the foot piece C. are extended from the front piece A. by thumb screws, S 1 S 2, S 3 represent thumb screws of iron passing through B. and working through an iron nut fixed to the inside of B. and pressing against an iron nut fastened to the front piece A. S 4 & S 5 represent two other thumb screws passing through the front piece C. and an iron nut on the inside of C. and pressing against an iron nut fastened to the front piece A. The boot front being drawn

9375X over the front piece A. and fastened to the back piece B. and the
foot piece C. of the crimping form by tacks B & C are then
extended from A. by turning the thumb screws S 1, S 2, S 3, S 4.
and S 5. until the boot front is brought into shape or form excep-
-ting the screws and nuts which are iron the residue of the crimping
form thus far is described is made of hard wood and it may be
used to great advantage in in this manner without any addition
But it is still better and contemplated to be used by adding a thin
plate of iron or brass which is fastened to the front piece A, marked
H. H. in drawing marked No 2 within which back piece B
and foot piece C enter The description of the crimping form
in drawing No 1 gives the full description of drawing No 2
excepting the Brass or iron plate which is fastened to the front piece
A, as aforesaid and is marked H. H. the leather of the boot front
is drawn over the front piece A, & the plate H. H. and fastened
to the wood or back piece B. and foot piece C. by tacks the exten-
-tion of which (B & C) by the thumb screws from A. crimps or
forms the boot front, this operation in forming the boot front
is much quicker than any other to my knowledge in use, and the
advantage is that the boot front is brought into form much
more even than by the usual process the leather being kept
of nearly equal thickness in all its parts much more so than
it is in any other process I have known to be used the expense
of the crimping form is so trifling and the time saved by it is
great and the manner by which the boot front is formed is so
much more perfect that I am persuaded its use will prove
to be highly beneficial Poland August the 17th 1835

Witnesses
Tilden Waterman
Josiah Perham

Wm Gerrish

[illegible]
W.G.

Drawing

[illegible]